United States Patent [19]

Mörner

[11] 4,331,457
[45] May 25, 1982

[54] DEVICE PREFERABLY FOR DRIERS FOR COMPRESSED AIR

[75] Inventor: Bengt O. J. S. Mörner, Askim, Sweden

[73] Assignee: SAB Automotive AB, Sweden

[21] Appl. No.: 189,961

[22] PCT Filed: Feb. 16, 1979

[86] PCT No.: PCT/SE79/00034
§ 371 Date: Oct. 22, 1979
§ 102(e) Date: Oct. 22, 1979

[87] PCT Pub. No.: WO79/00642
PCT Pub. Date: Sept. 6, 1979

[30] Foreign Application Priority Data

Feb. 20, 1978 [SE] Sweden .................. 7801910

[51] Int. Cl.³ .......................................... B01D 53/04
[52] U.S. Cl. .................................. 55/163; 55/179; 55/196; 55/387
[58] Field of Search ......... 55/31, 33, 35, 62, 161–163, 55/179, 180, 196, 387

[56] References Cited

U.S. PATENT DOCUMENTS

| 1,887,606 | 11/1932 | Thomas | 55/162 |
| 3,160,486 | 12/1964 | Busch, Jr. | 55/162 |
| 3,258,899 | 7/1966 | Coffin | 55/179 X |
| 3,323,292 | 6/1967 | Brown | 55/179 X |
| 3,324,631 | 6/1967 | Kreuter | 55/163 |
| 3,365,861 | 1/1968 | Crowley et al. | 55/162 |
| 3,472,000 | 10/1969 | Glass et al. | 55/163 |
| 3,552,096 | 1/1971 | Dayson | 55/179 X |
| 3,659,399 | 5/1972 | Kauer, Jr. et al. | 55/163 X |
| 3,778,967 | 12/1973 | Kauer, Jr. et al. | 55/163 X |

FOREIGN PATENT DOCUMENTS 74105214 8/1974 Sweden .
75051599 5/1975 Sweden .

Primary Examiner—Robert H. Spitzer
Attorney, Agent, or Firm—Steele, Gould & Fried

[57] ABSTRACT

An air controlling device for use in a dryer for compressed air comprises dual containers of water absorbing, air permeable material arranged in parallel, each of the dual containers being alternately selected to dry compressed air and to be purged, two separate valve members, actuated by impulses of power, changing the connections between alternate containers.

6 Claims, 3 Drawing Figures

4,331,457

DEVICE PREFERABLY FOR DRIERS FOR COMPRESSED AIR

BACKGROUND OF THE INVENTION

1. Field of the Invention

The present invention relates to a device for driers for compressed air and provided to change the communication between an inlet pipe and exhaust pipe on one hand and a first outlet pipe and a second outlet pipe on the other hand, which inlet emanates from a pressure source and which exhaust pipe is in communication with the free atmosphere, and which first outlet pipe is in communication with a first connected element of the drier as a first drying receptacle and which second outlet pipe is in communication with a second element as a second drying receptacle, the device being provided in a first functioning condition to connect the inlet with the first outlet and the second outlet with the exhaust pipe and in a second functioning condition to connect the inlet with the second outlet and the first outlet with the exhaust pipe under influence of power impulses.

2. Description of the Prior Art

The compressed air supplied by a compressor plant generally contains water. This water can give rise to serious drawbacks in connection with the use of the compressed air as for example disturbances in the function of the valves and accumulation of liquid in apparatuses and instruments, which can bring about malfunctions, and in case of congealation of the water such malfunctions can be of very serious nature. In systems driven by compressed air comprising valves, instruments and other delicate components it is therefore the usual thing to provide a drier for the compressed air. A known type of such a drier comprises two receptacles, which contain a water adsorbing or absorbing agent as for example silica gel. These two receptacles are alternatively connected to the current of air from the compressor plant, the liquid contents of the air thereby being taken up by said content of the receptacle. After a certain period of time, which is not greater than that the contents of the receptacle still can be calculated to have a remaining liquid absorbing capacity, the other receptacle is connected. This second receptacle during the period of time, when the first receptacle has been connected, has been aerated, so that in any case the main quantity of earlier absorbed liquid has been driven out of the liquid absorbing contents of the receptacle. After the second receptacle has been connected to the current of air, an aerating of the first mentioned receptacle takes place and so on in a continuously repeated cycle. The aerating can be made by forcing a small quantity of the produced and dried compressed air through the receptacle in turn to be aerated. As an alternative a separate fan installation can be provided for the aerating and then be alternatively connected to the two receptacles.

SUMMARY OF THE INVENTION

In order to control the cycle mentioned it is known to use an electric program work, which by means of magnetic valves in the intended manner controls the flow of the current of compressed and dried air respectively. However such a regulating system implies a considerable investment, which in a negative manner affects the cost of production, and this especially in connection with small and in themselves comparatively inexpensive drying installations for by way of example compressed air systems for vehicles or individual drying installations for instruments or groups of instruments. In certain compressed air systems it is not necessary to dry the entire quantity of air produced, but only a part intended for sensitive consumer apparatuses. Moreover in certain cases electric systems may be of considerable disadvantage because of the fact that they require a current supply and that they under certain conditions of operation are sensitive to disturbances in function.

According to the present invention the mentioned drawbacks are eliminated by means of a device which is characterized by a first and a second duct to each one of which one of the outlet pipes is connected, a first valve arranged in an alternating manner to connect the inlet pipe to one of the ducts, a valve, which is arranged to connect the exhaust pipe to one of the ducts, namely to that duct, which at that moment is not connected to the inlet pipe, a body, controlled by force which is movable by means of a power means between a first position, in which it by force retains the second valve in the connecting position it has taken and permits communication from the valve to the exhaust pipe, and a second position in which the valve is free to change its connecting position, and in which the communication between the valve and the exhaust is interrupted, the first valve and the second valve being provided to change position during the period, when the body controlled by force occupies its second position and in that way that when the first valve in its connecting condition maintains the first one of the ducts in communication with the inlet pipe the other valve maintains the other duct connected to the exhaust pipe and vice versa.

By means of the invention a controlling device is obtained which exhibits simple, robust means, possible to manufacture at low cost and which can function exclusively by means of compressed air without having to resort to any electric power.

BRIEF DESCRIPTION OF DRAWINGS

Two embodiments of the invention are illustrated in the accompanying drawings and will be described in the following.

DETAILED DESCRIPTION OF THE PREFERRED EMBODIMENTS

Figure 1:
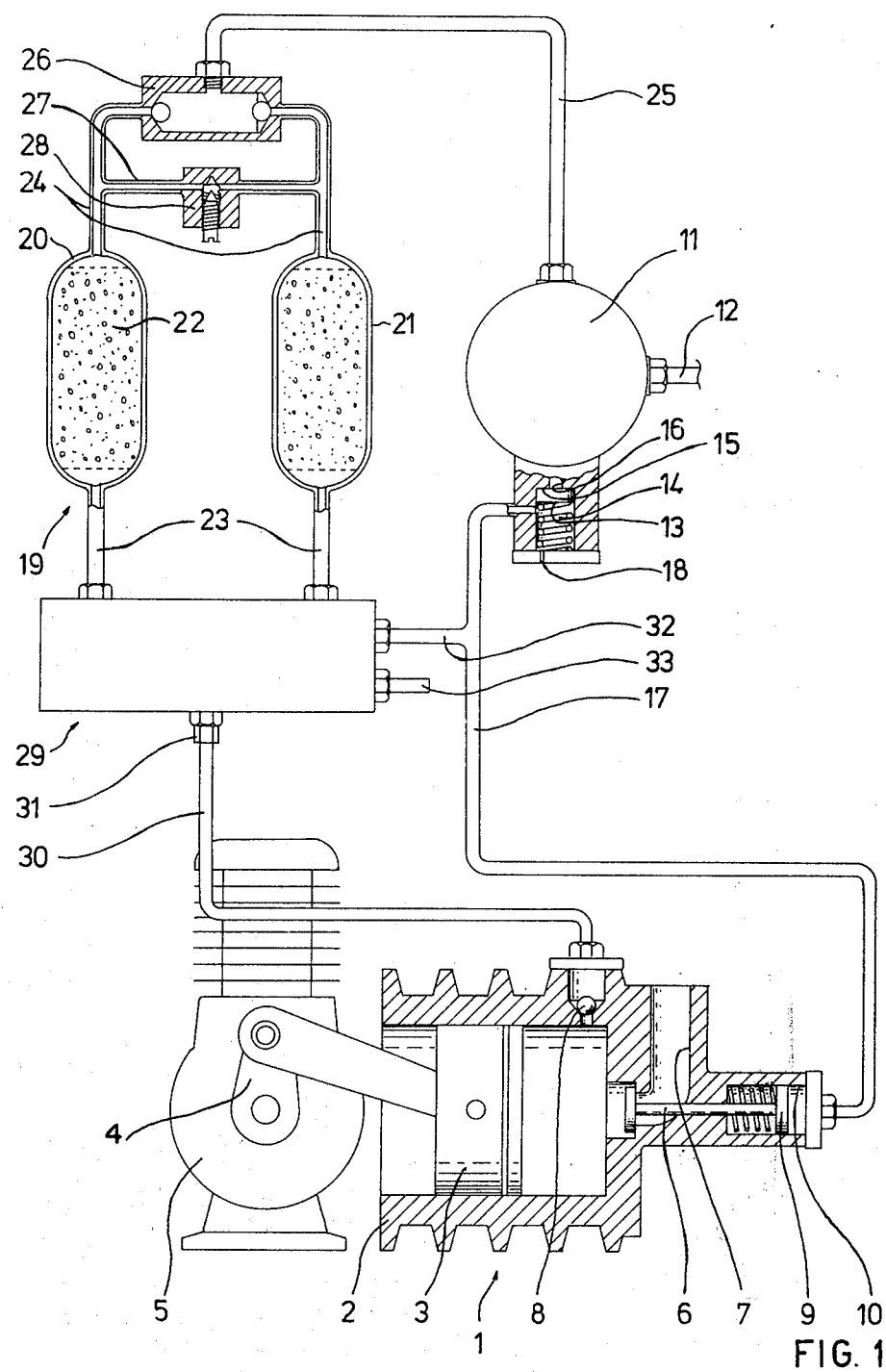
FIG. 1 somewhat schematically shows a plant for the production of compressed air and provided with an air drier according to the first example of a simplified embodiment of the invention.

FIG. 1 shows a compressed air plant with a compressor 1 with a cylinder 2 in which a piston 3 by means of a crank mechanism 4 can be driven in a reciprocating movement by a combustion engine 5. The cylinder is provided with a suction valve 6, spring loaded to occupy a closed position, through which air from the surrounding atmosphere via an intake duct 7 being let in into the cylinder during the movement of the piston out of the cylinder, while an outlet valve 8 is provided in order to let out the compressed air from the cylinder during the inwards stroke of the piston. The suction valve 6 is in the form of a discharge valve and comprises a piston 9 in a cylinder 10 which piston is in connection with the valve disc.

The compressed air is from the outlet valve 8 delivered to a receptacle 11 provided with an outlet coupling 12 for the connection of consumption apparatuses and means. A differential valve with a valve body 13 is connected to the receptacle 11, which valve body by means of a spring 14 is pressed against a seat 15 with a hole 16, which communicates with the interior of the receptacle 12, the diameter of said hole being smaller than the external diameter of the seat and of the valve body 13. A pipe 17, which is connected to the cylinder space 10 of the discharge inlet valve, extends from the space, in which the valve body 13 can displace itself.

The differential valve 13–16 functions in such a manner that, when the pressure in the receptacle during the operation of the compressor 1 has reached such a level that the pressure against the surface of the valve body 13 exposed to the hole 16 overcomes the bias of the spring, the valve body 13 will be lifted up from the seat 15. Then the compressed air will act upon the whole surface of the valve body 13, which is greater than the surface previously exposed in front of the hole 16, so that the force operating on the valve body instantaneously increases. Then it is moved instantaneously backwards for such a distance that a communication between the pipe 17 and the hole 16 and consequently also the interior of the receptacle 11 will be established. The air rushes through the pipe 17 to the cylinder space 10 and thereby acts upon the piston 9, so that the suction valve 6 is urged to raise itself from its seat and will be open also during the compressing stroke of the piston 3. Then any compression of air cannot take place inside the cylinder 2, the air during the movement of the piston only rushing forwards and backwards in the suction duct 7. Thus, any compressed air is not produced.

When the pressure inside the receptacle 11 due to consumption has diminished sufficiently, the spring 14 again is capable to move the valve body 13 against the seat. As soon as it is lying against the seat it will only be exposed to pressure on an area corresponding to the area of the hole 16 thereby obtaining a firm bearing against the seat. In this position of the valve body 13 the pipe 17 gets in communication with the space behind the valve body, and thereby the pipe is de-aired through a de-airing hole 18, which also leads the de-airing of the cylinder space 10, and the suction valve 6 is closed, so that compressed air again is produced. This goes on until the previously mentioned higher pressure in the receptacle 11 is reached, when the differential valve is again opened and a new discharge period is obtained.

An air drier 19 comprising two receptacles 20 and 21 with contents 22 of silica gel in the form of beads is introduced between the outlet valve 8 and the receptacle 11 in order to dry the air produced. The contents 22 are penetrable by air, and air can be conveyed through the respective receptacle from a first pipe 23 to a second pipe 24. The pipes 24 are connected with a pipe 25, which leads to the receptacle 11, check valves 26 being introduced in the pipe, which only permit that air is led to the receptacle 11 but not in the reverse direction. A shunt 27 with a controllable choker valve is introduced between the receptacles 20 and 21.

The pipes 23 are connected to an air controlling device 29 according to the invention, which in its turn is connected to the outlet valve 8 via a pipe 30 provided with a check valve 31, which only permits that the air is led to the controlling device 29. The controlling device 29 is moreover connected with the pipe 17 by means of a branch conduit 32 and also exhibits an exhaust pipe 33.

As mentioned in the preamble the air is in alternating manner forced through the two receptacles 20 and 21 and in this connection it is controlled by means of the controlling device 29. During the interval of time, when by way of example the receptacle 20 is not connected into the flow of compressed air to the receptacle 11, it is by means of the pipe 23 in communication with the exhaust pipe 33. Thus, there is no significant pressure resistance in the receptacle, which means that compressed air after passage through the receptacle 21 is blown through the pipe 27 through the contents 22 of the receptacle 20 in the reverse direction to the flow through the receptacle 21 and out through the exhaust pipe 33. The air stream can be adjusted by means of the choker valve 28. In this operation the contents 22 are dried, and the receptacle 20 is after a certain period of ventilation ready for a renewed connection into the current of compressed air in order to dry the air. This takes place by switching the air current in the regulating device 29, the receptacle 21 taking over the function of the receptacle 20, and thus the contents of the same are dried, while the receptacle 20 now functions for the drying of the air.

The devices and functions now described are earlier known from the compressed air technique. Therefore any further description of them in addition to the one already given will not be made. However, within the range of applications of the invention they can be varied without therefore exceeding the scope of the invention.

Thus according to what has been evident from the foregoing, the controlling device 29 in alternating manner shall put the two pipes 23 in communication with the pipe 30 and the exhaust pipe 33 respectively. For this purpose a valve housing 51 is provided with two ducts 52 and 53, which are connected to the two respective pipes 23. The ducts 52, 53 are connected with two chambers, one outlet chamber 54 and one inlet chamber 55.

The ducts exhibit seats in both chambers, in the chamber 54 a seat 85 for the duct 52, and a seat 56 for the duct 53, and in the chamber 55 a seat 57 for the duct 52 and a seat 58 for the duct 53. In the chamber 55 also the pipe 30 debouches.

A bore 59 serving the purpose of a guide for a shank 60 of a valve body 61 communicates with the chamber 54. The end of the valve shank 60 opposing the valve body 61 exhibits a piston 62, which is movable in a cylinder space 63 of the valve housing 51, and which from one side is subjected to the load of a spring 64 and from the other side can be influenced by compressed air from the pipe 32 via a duct 65. The bore 59 at a thinner top portion 66 of the valve shank 60 is in communication with the exhaust pipe 33 by means of a duct 67. The valve body 61 exhibits an annular recess 68 and the seats 85, 56 are located in a shallow groove 69, the seats being located right in front of the annular groove 56. A ball 70, which is provided in order to close alternatively seal against anyone of the seats 85, 56 is placed on top of the valve body 61.

A flip-flop valve 71 is placed inside the chamber 55. This valve is arranged to vacillate in the chamber 55, which exhibits a triangular cross-section, thereby bearing against or to one or to the other of the seats 57, 58. Such valves are known from the compressed air technique, and are used among other things in order to switch over the air to the two sides of a piston of a pneumatic hammer tool. Such a valve occupies one of its two positions, when actuated by compressed air in dependence on the counter-pressure at the seats, which it can close, and without anything acting upon it from the outside it will change its position in connection with a changed condition of counter-pressure. However, this part is known in the prior art and therefore does not require any detailed description.

Figure 2:
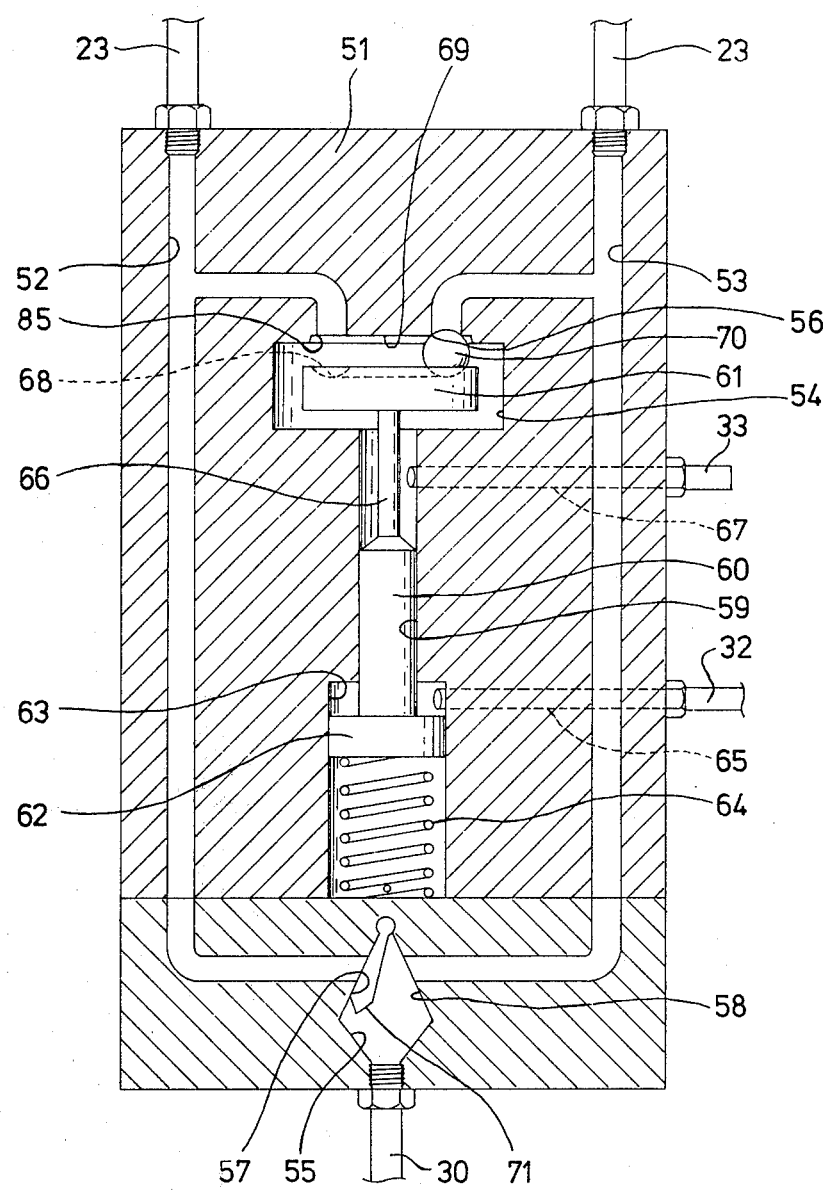
FIG. 2 is a cross-sectional view of the device according to the first example of embodiment and FIG. 3 is a cross-sectional view of the device according to the second example of embodiment.
Figure 3:
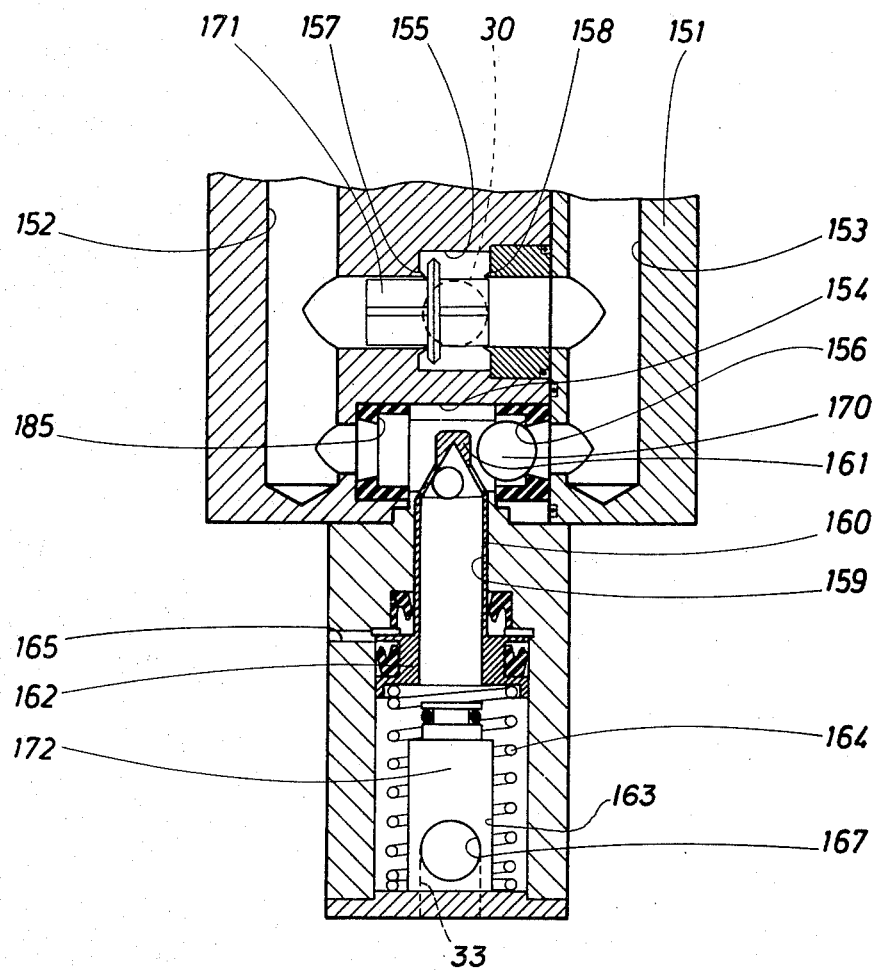

The regulating device according to the second embodiment illustrated in FIG. 3 substantially has the same function, and parts of it with equal function are indicated with a number, which is one hundred units greater than the numbers appearing in FIG. 2. Thus, a valve housing 151 exhibits two ducts 152 and 153, which are connected to the two respective pipes 23. The ducts 152, 153 are connected with two chambers, one outlet chamber 154 and one inlet chamber 155. The ducts exhibit seats in both chambers, in the chamber 154 a seat 185 for the duct 152 and a seat 156 for the duct 153, and in the chamber 155 a seat 157 for the duct 152 and a seat 158 for the duct 153. The pipe 30 also debouches in the chamber 155.

A bore 159 is in connection with the chamber 154 and constitutes a guide for a shank 160 of a guide body 161. The end of the valve shank 160 opposing the guide body 161 exhibits a piston 162, which can displace itself in a cylinder space 163 of the valve housing 151, and from one side it can be subjected to the load of a spring 164, and from the other side it can be subjected to the influence of compressed air from the pipe 32 via a duct 165. The chamber 154 via the tubular valve shank 160 is in communication with the exhaust pipe 33 by means of a duct 167. A ball 170, which is provided to close one or the other of the two seats 185, 156, is placed at the side of the guide body 161, which is of conical shape. A sealing piston 172 is placed under the piston 162 and can close the tubular valve shank 160, when the piston is in its low position.

A change-over valve body 171 corresponding to the flip-flop valve 71 is placed in the chamber 155. This body 171 is displaceable between the two ends of the chamber 155 and in connection therewith arrive in a bearing position against one or the other of the two seats 157, 158.

If in the embodiment according to FIG. 2 one assumes that the flip-flop valve 71 is in the position shown and that any discharge through the suction valve 6 does not take place, air from the pipe 30 flows through the duct 53 to one of the receptacles via its pipe 23. As there is not any pressure in the duct 65, the spring 64 presses the valve body 61 towards its upper position. The ball 70 then, as is evident, bears against the seat 56. Thus, any air cannot escape from the duct 53 to the chamber 54. On the other hand the duct 52, which at its inner end is closed by the flip-flop plate 71, is in communication with the chamber 54 and via this chamber and bore 59 at the thinner top portion 66 of the valve shank 60 is in communication with the exhaust pipe 33, which communicates with the duct 67.

When the discharge takes place, air penetrates into the cylinder space 63 and the piston is moved downwards. Then the valve body 61 with its side facing the shank 60 will arrive in bearing position against the wall of the chamber 54. In this manner the outlet to the exhaust pipe 33 via the duct 67 is closed.

Then the ball 70 will no longer be pressed against the seat 56. As the pressure in the duct 53 is greater than the pressure in the duct 52, which communicates with the one of the receptacles, which is being de-aired, air flows from the seat 56 and out through the seat 85 pushing the ball 70 to the seat 85, during which movement said ball is guided by the grooves 68, 69. When the ball 70 has reached the seat 85 it is pressed against the same by said pressure difference, and, thus, any communication between the pipes 23 cannot be established via the chamber 54 but only by the choked shunt 27.

During the discharge period the pressure between the two receptacles 20, 21 is gradually levelled out by overflow through the pipe 27, and the ball 70 is no longer capable to seal against the seat 85 solely by the difference in pressure. When the differential valve closes and the compressor again starts to produce compressed air, the pressure increases and a pressure shock is obtained in the pipe 30. The choking effect of the duct 65 is in this connection adjusted in such a manner that this pressure shock will reach the device before the cylinder space 63 has been emptied, and the valve body 61 again has occupied its upper position according to FIG. 2. This pressure shock propagates from the duct 53 via the chamber 54 to the duct 52 and produces a pressure shock at the seat 57, so that the valve 71 switches over to the seat 58. When the cylinder space 63 is emptied, and the valve body 61 again has occupied its upper position illustrated in FIG. 2, the ball 70 again closes up the seat 85. Because of the fact that the valve 71 has switched over, the inlet pipe 30 is now in communication with the duct 52. The duct 53 on the other hand is via the seat 56 and the chamber 54 in communication with the exhaust pipe 33. Thus, a reversed function has been obtained.

Thus, each time the differential valve 13-16 performs a discharge operation, a reversal of the functions of the receptacles 20, 21 takes place, the receptacles, however, being completely disconnected from the supply of compressed air, while the discharge operation is going on. This signifies an automatic function implying the nonfunction of the receptacles 20 and 21 except in the cases, when the compressor produced compressed air. However, a certain compensation of the pressure via the pipe 27 between the two receptacles takes place via the pipe 27, when the discharge operation is going on, which has turned out to be advantageous because of the fact that the pressure shock, to which the contents of a receptacle is subjected in connection with every renewal of the operation of the compressor, is thereby moderated.

If in connection with the second embodiment according to FIG. 3 one assumes that the valve body 171 is in the position shown and that any discharge operation is not going on, air flows from the pipe 30 through the duct 153 to one of the receptacles via its pipe 23. As there is no pressure in the duct 165 the spring 164 presses the guide body 161 towards its upper position. As is evident the ball 170 then bears against the seat 156. Thus, any air cannot escape from the duct 153 to the chamber 154. On the other hand the duct 152 which at its inner end is closed by the valve body 171, is in communication with the chamber 154 and via this chamber and the tubular valve shank 160 with the exhaust pipe 33, which is connected with the duct 167.

When a discharge operation takes place, air penetrates into the cylinder space 163, and the piston is moved downwards. The guide body 161 then will get its shank 160 closed up by the tightening piston 172. Thus, the outlet to the exhaust pipe 33 via the duct 167 is interrupted.

The guide body does not any longer prevent the ball 170 from being displaced from the seat 156. As the pressure is greater in the duct 153 than in the duct 152, which communicates with the receptacle being deaired, air flows from the seat 156 and out through the seat 155 moving the ball 170 to the seat 185. When the ball 170 has reached the seat 185, it is because of the pressure difference mentioned pressed against this seat, and thus, any communication between the pipes 123 cannot take place via the chamber 154 but only through the choked pipe 127.

During the period, when the discharge operation is taking place, the difference in pressure between the two receptacles 20, 21 is as mentioned levelled out by the passage of air via the pipe 27, and the ball 170 is no longer capable of sealing against the seat 185 solely by the difference in pressure. When the discharge operation is ended, and the compressor again starts producing compressed air, the pressure increases and a pressure shock is obtained in the pipe 30. The choking of the duct 165 is in this connection such that this pressure shock will reach the device before the cylinder space 163 has been emptied and the guide body 161 again has occupied its upper position according to FIG. 3. This pressure shock propagates from the duct 153 via the chamber 154 to the duct 153 and produces a pressure shock at the seat 157, so that the valve body 171 is switched over to the seat 158. When the cylinder space 163 is emptied and the guide body 161 again has occupied its upper position according to FIG. 3, the ball 170 again closes the seat 185. Because of the fact that the valve body 171 has been changed over, the inlet pipe 30 is now in communication with the duct 152. The duct 153 on the other hand is in communication with the exhaust pipe 33 via the seat 156 and the chamber 154. Thus, a reversed function has been obtained also in this case.

In both embodiments the pressure in the discharge pipe 17 of the plant is utilized for the reversal of the functions. However, it is possible to influence the valve body 60-62 and the vale body 160-162 respectively by other means in order to move the same between these two positions. Thus, an electromagnet, which is controlled from the motor current of an electrically driven compressor can be used. It is also possible to use a timing control means as by way of example a timing relay. In connection with continuously driven compressors like such ones driven by combustion engines, in which a pneumatic discharging is provided, a very simple control is made possible in the manner described and without any electric means or any need of a current supply. On the other hand in connection with plants driven by electric motors, the drive as a rule is of intermittent kind by means of a pneumatic switch, which in such cases can be connected with the electromagnet mentioned for the movement of the respective valve bodies.

I claim:

1. An air controller for use in a compressed air producing plant including an air compressor and a compressed air drying device disposed downstream of the compressor and including two containers each filled with water absorbing, air permeable charge, the containers being arranged in parallel relative to each other and each having an inlet adapted to communicate with a pressure side of said compressor, and an outlet adapted to communicate with further sections of the plant, the outlets being interconnected by a shunt pipe having a reduced rate of flow relative to the rate of flow through any of the respective outlets of the containers, the controller effecting alternate purge of the charge in the containers by a countercurrent passage of dried air through one of said containers to remove water accumulated therein, said controller comprising a housing including an inlet port adapted to communicate with a source of wet pressurized air, a first outlet port and a second outlet port, each of said outlet ports being adapted to communicate with a first and second one of said containers, and a venting port communicating with free atmosphere, the controller further comprising:
(a) said inlet port communicating with said outlet ports through a first and a second duct in the housing, said ducts each having an upstream and communicating with a first valve chamber through a respective valve seat, a flip-flop valve member being disposed within said first valve chamber for alternate engagement with one of said valve seats;
(b) said first and second ducts communicating with each other through a second valve chamber having two valve seats, one at each end of the chamber communicating with the respective duct;
(c) a second valve member arranged for alternately engaging one of the two valve seats of the second valve chamber;
(d) a valve member retainer means provided in said housing and including spring means for resiliently urging said second valve member into engagement with the respective one of said valve seats of the second valve chamber, said retainer means including release means allowing free displacement of said second valve member from one of the second valve chamber seats to the other on displacement of said retainer means against the force of said spring means;
(e) said second valve chamber including a vent passage communicating between the second valve chamber and said venting port, said vent passage being operatively associated with a vent shut-off means adapted to interrupt the communication between the second valve chamber and the venting port on displacement of the retainer means against the force of the spring means; and,
(f) power means for inducing displacement of said retainer means against the force of said spring means.

2. A controller as claimed in claim 1, wherein said power means is an electromagnetic device.

3. A controller as claimed in claim 1, wherein said power means is a pneumatic-mechanical device.

4. A controller as claimed in claim 3, wherein said power means is a pneumatic piston-cylinder device operatively associated with said retainer means and adapted to be operatively associated with a pressurized air source.

5. A controller as claimed in claim 4, wherein said pressurized air source is a pressurized air storage tank disposed downstream of said containers and including a differential valve arranged to open the communication between the storage tank and the piston-cylinder device when the pressure in said tank reaches a predetermined value.

6. A controller as claimed in claim 5, wherein a connection conduit communicating between the differential valve and the piston-cylinder device includes a branch operatively associated with a respective compressor to interrupt the production of compressed air by the compressor on opening of said differential valve thus reducing air pressure in said first valve chamber.

* * * * *